(12) United States Patent
Watanabe et al.

(10) Patent No.: US 10,628,917 B2
(45) Date of Patent: Apr. 21, 2020

(54) INFORMATION PROCESSING APPARATUS, INFORMATION PROCESSING METHOD, AND COMPUTER PROGRAM PRODUCT

(71) Applicant: Kabushiki Kaisha Toshiba, Minato-ku (JP)

(72) Inventors: Tomoki Watanabe, Inagi (JP); Yuma Sano, Setagaya (JP); Tsuyoshi Tasaki, Yokohama (JP)

(73) Assignee: Kabushiki Kaisha Toshiba, Minato-ku (JP)

( * ) Notice: Subject to any disclaimer, the term of this patent is extended or adjusted under 35 U.S.C. 154(b) by 225 days.

(21) Appl. No.: 15/683,911

(22) Filed: Aug. 23, 2017

(65) Prior Publication Data
US 2018/0189927 A1 Jul. 5, 2018

(30) Foreign Application Priority Data
Jan. 5, 2017 (JP) .................................. 2017-000309

(51) Int. Cl.
*G06K 9/00* (2006.01)
*G06T 3/00* (2006.01)
(Continued)

(52) U.S. Cl.
CPC .......... *G06T 3/0093* (2013.01); *G01B 11/285* (2013.01); *G01C 21/32* (2013.01); *G01C 21/3667* (2013.01); *G01S 7/295* (2013.01); *G01S 7/4808* (2013.01); *G01S 13/931* (2013.01); *G01S 17/936* (2013.01); *G06T 7/62* (2017.01); *G08G 1/163* (2013.01);
(Continued)

(58) Field of Classification Search
CPC combination set(s) only.
See application file for complete search history.

(56) References Cited

U.S. PATENT DOCUMENTS 4,884,225 A * 11/1989 Fogarty .............. G06K 9/00134
382/133
2012/0242505 A1 9/2012 Maeda et al.
(Continued)

FOREIGN PATENT DOCUMENTS

| EP | 2 687 868 A1 | 1/2014 |
| JP | 6-214006 | 8/1994 |

(Continued)

OTHER PUBLICATIONS

Florian Homm, et al , "Efficient Occupancy Grid Computation on the GPU with Lidar and Radar for Road Boundary Detection", IEEE Intelligent Vehicles Symposium, Jun. 21-24, 2010, pp. 1006-1013.

*Primary Examiner* — Alex Kok S Liew
(74) *Attorney, Agent, or Firm* — Oblon, McClelland, Maier & Neustadt, L.L.P.

(57) ABSTRACT

An information processing apparatus according to an embodiment includes a memory and one or more processors configured to function as a map acquisition unit, a filtering unit and a converting unit. The map acquisition unit acquires a polar coordinate map specifying first occupancy of a target in a polar coordinate space. The filtering unit performs filtering on the polar coordinate map using filtering windows of sizes corresponding to a distance from a reference position. The converting unit converts the filtered polar coordinate map into a rectangular coordinate space.

16 Claims, 11 Drawing Sheets

(51) Int. Cl.
*G01B 11/28* (2006.01)
*G06T 7/62* (2017.01)
*G01C 21/32* (2006.01)
*G01C 21/36* (2006.01)
*G01S 7/295* (2006.01)
*G01S 7/48* (2006.01)
*G01S 13/931* (2020.01)
*G01S 17/93* (2020.01)
*G08G 1/16* (2006.01)
*G01C 21/00* (2006.01)

(52) U.S. Cl.
CPC ............. *G08G 1/165* (2013.01); *G08G 1/166* (2013.01); *G01C 21/005* (2013.01); *G06T 3/0056* (2013.01)

(56) References Cited

U.S. PATENT DOCUMENTS

| | | | |
|---|---|---|---|
| 2013/0128034 A1* | 5/2013 | Carr | G06K 9/00771 348/135 |
| 2017/0116487 A1 | 4/2017 | Yamazaki et al. | |
| 2017/0344021 A1 | 11/2017 | Sano et al. | |
| 2017/0344844 A1 | 11/2017 | Sano et al. | |
| 2017/0345182 A1 | 11/2017 | Sano et al. | |

FOREIGN PATENT DOCUMENTS

| | | |
|---|---|---|
| JP | 2017-83919 A | 5/2017 |
| JP | 2017-215939 A | 12/2017 |
| JP | 2017-215940 A | 12/2017 |

\* cited by examiner

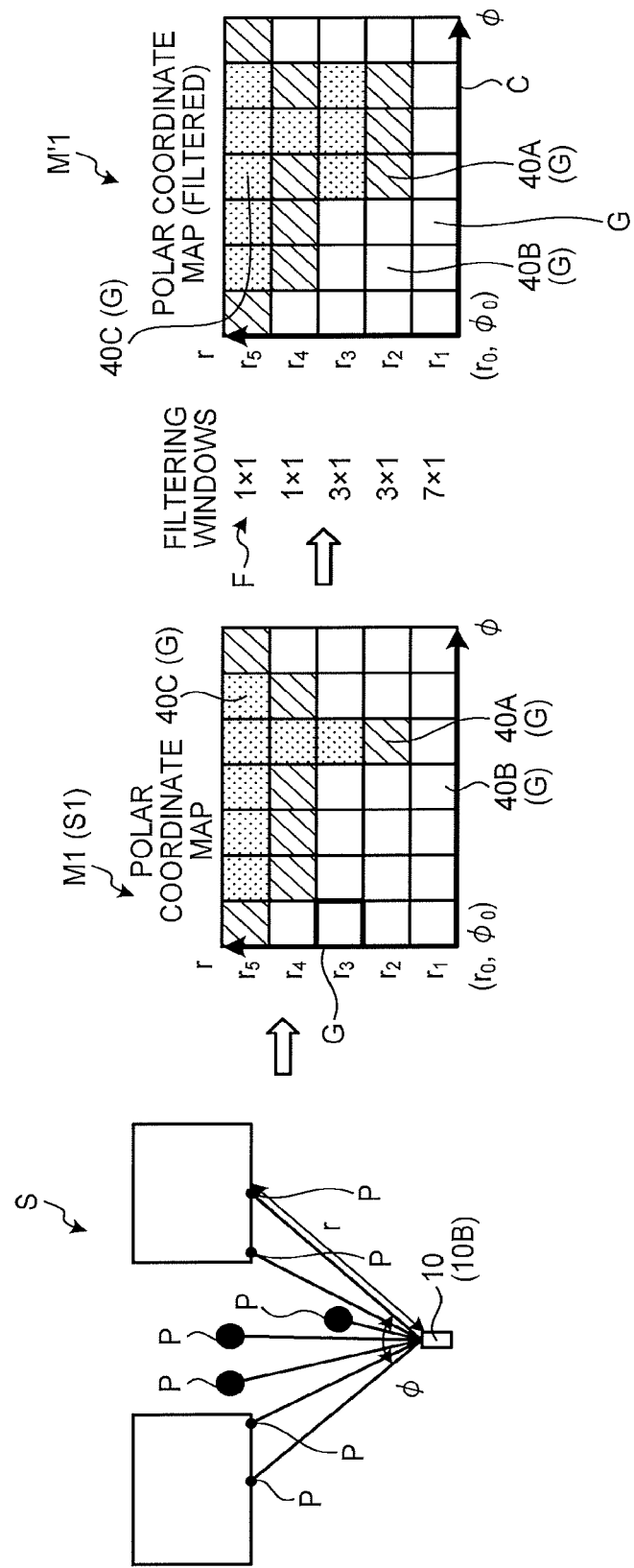

CORRESPONDENCE OF COORDINATES IN DEFORMATION

RECTANGULAR COORDINATE MAP

CORRESPONDENCE OF COORDINATES IN DEFORMATION

COMPARATIVE RECTANGULAR COORDINATE MAP

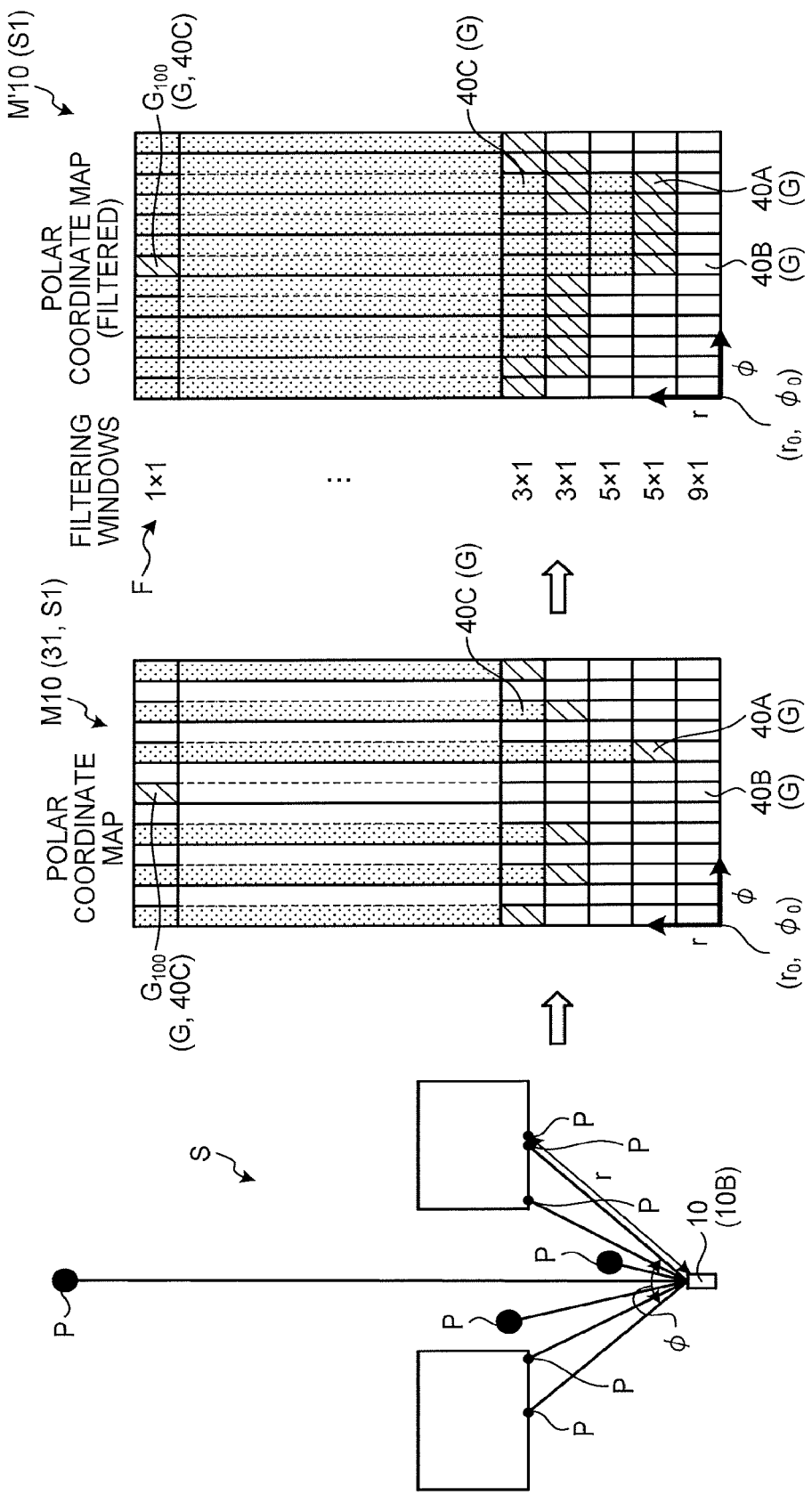

FIG.10A
FIG.10B
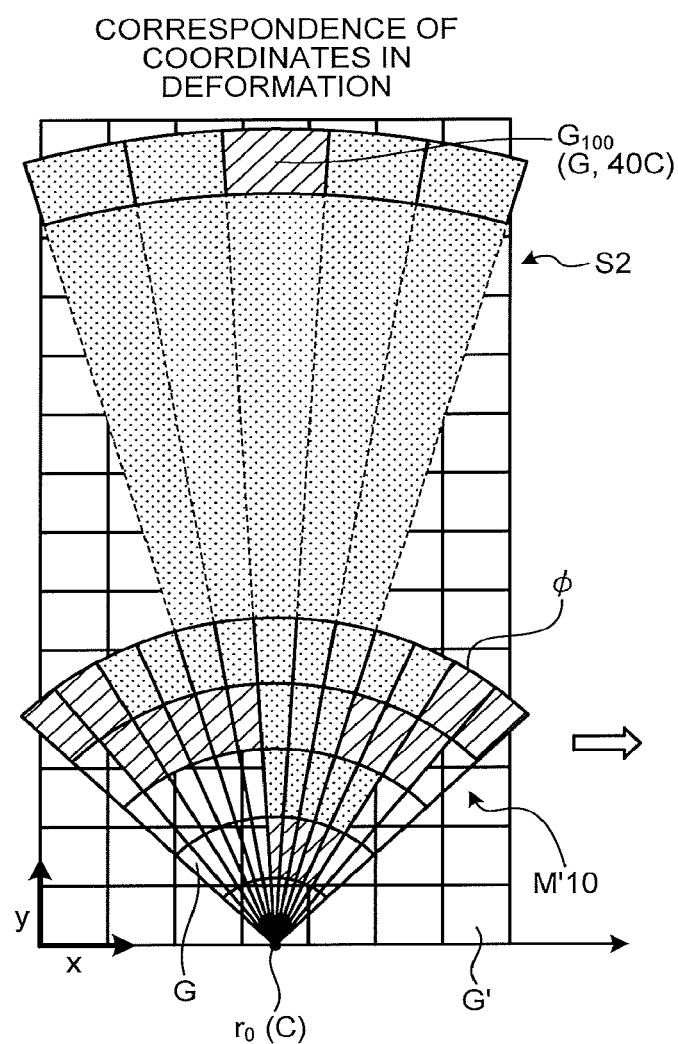
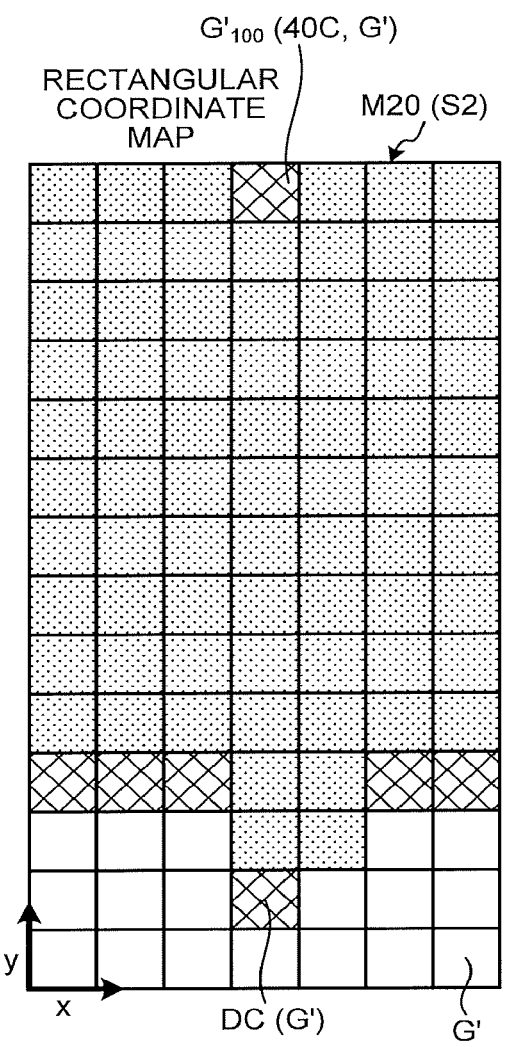

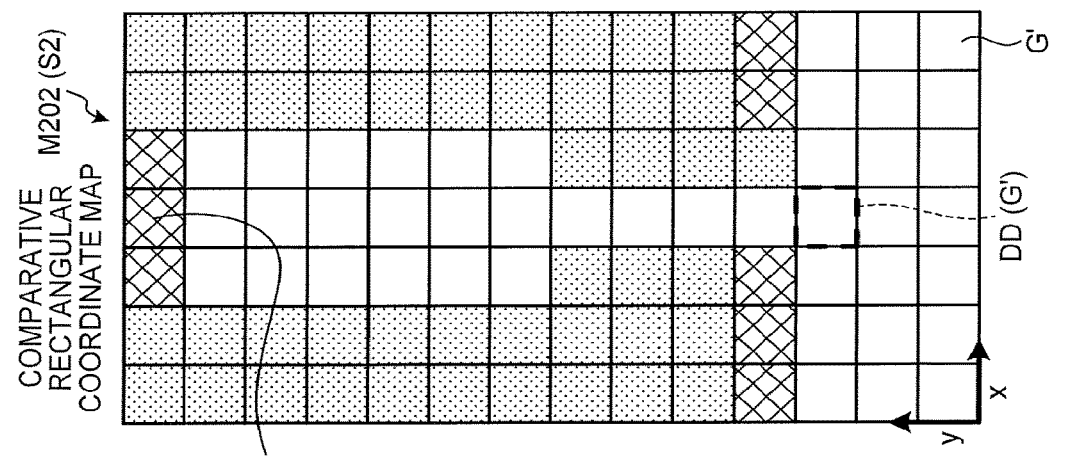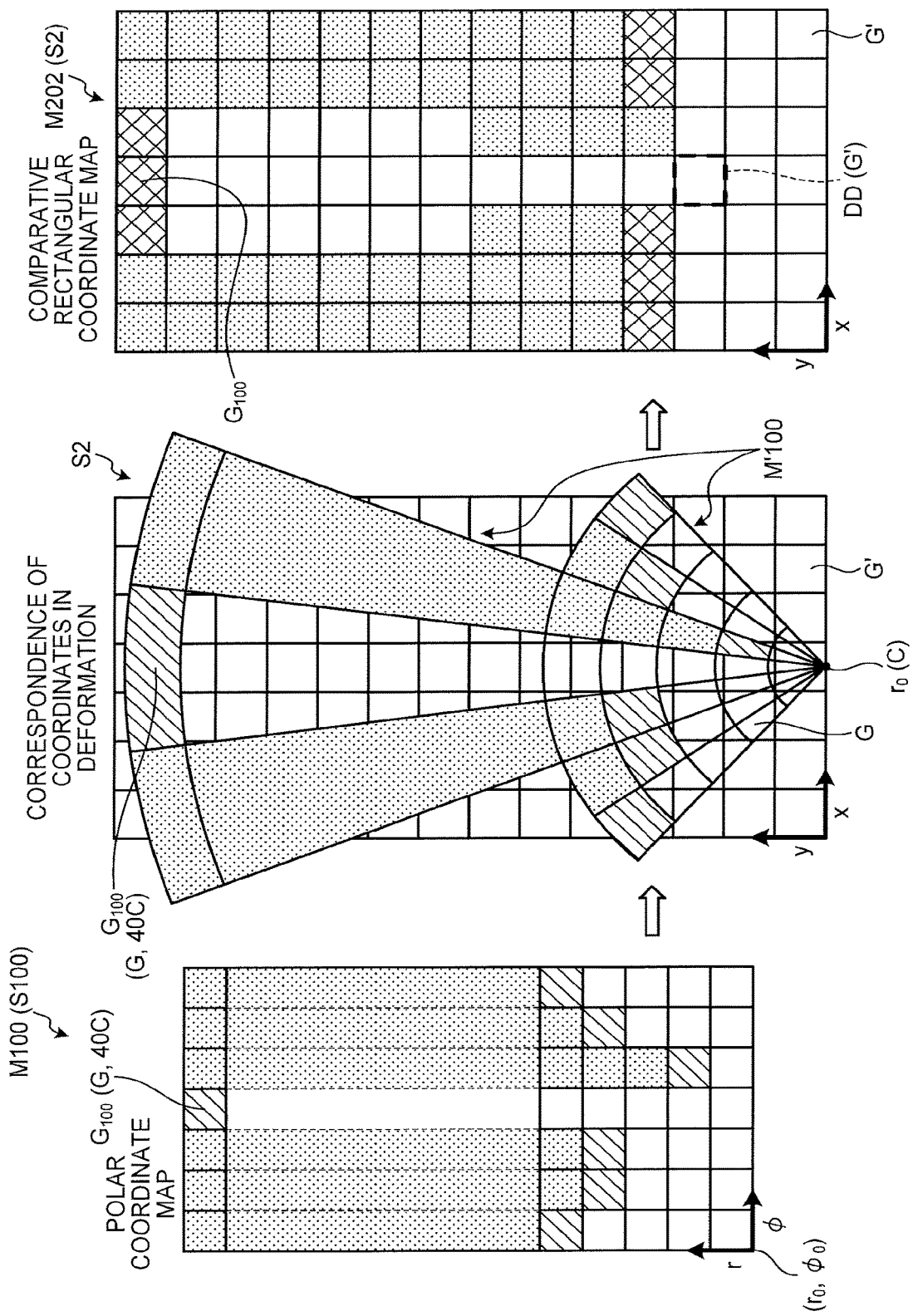

INFORMATION PROCESSING APPARATUS, INFORMATION PROCESSING METHOD, AND COMPUTER PROGRAM PRODUCT

CROSS-REFERENCE TO RELATED APPLICATIONS

This application is based upon and claims the benefit of priority from Japanese Patent Application No. 2017-000309, filed on Jan. 5, 2017; the entire contents of which are incorporated herein by reference.

FIELD

Embodiments described herein relate generally to an information processing apparatus, an information processing method, and a computer program product.

BACKGROUND

Systems generating an obstacle map on the basis of positional information of points acquired using a sensor are known. Such systems generate a polar coordinate map specifying occupancy of obstacles for each region obtained by dividing the polar coordinate space into a plurality of regions. The systems use a rectangular coordinate map obtained by converting the polar coordinate map into a rectangular coordinate space, as the obstacle map.

When a polar coordinate map is converted into a rectangular coordinate map, each region of the polar coordinate map is deformed, and the resolution is changed. Specifically, in coordinate transformation, occupancy of each of the regions of the rectangular coordinate space is derived using occupancy specified for one or a plurality of regions corresponding thereto in the polar coordinate space. This structure may markedly reduce the occupancy specified in the polar coordinate map due to coordinate transformation. Accordingly, a conventional art has an insufficient reliability of occupancy of the target, such as obstacles.

BRIEF DESCRIPTION OF THE DRAWINGS

FIG. 3A to FIG. 3D are explanatory diagrams of derivation of a rectangular coordinate map;
FIG. 9A to FIG. 9D are explanatory diagrams of derivation of a rectangular coordinate map;
FIG. 10A and FIG. 10B are explanatory diagrams of derivation of a rectangular coordinate map;
FIG. 11A to FIG. 11C are explanatory diagrams of a conventional method.

DETAILED DESCRIPTION

An information processing apparatus according to an embodiment includes a memory and one or more processors configured to function as a map acquisition unit, a filtering unit and a converting unit. The map acquisition unit acquires a polar coordinate map specifying first occupancy of a target in a polar coordinate space. The filtering unit performs filtering on the polar coordinate map using filtering windows of sizes corresponding to a distance from a reference position. The converting unit converts the filtered polar coordinate map into a rectangular coordinate space.

The following is a detailed explanation of an information processing apparatus, an information processing method, and a computer program product with reference to attached drawings.

Figure 1:
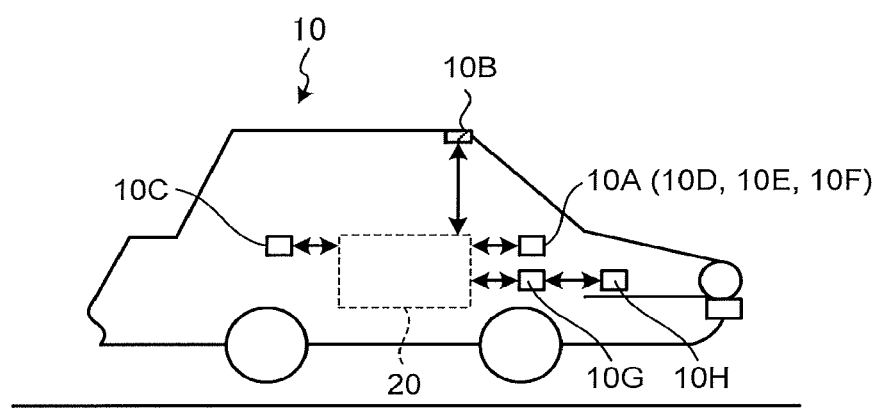
FIG. 1 is a diagram illustrating a moving body.

FIG. 1 is a diagram illustrating an example of a moving body 10 according to the present embodiment.

The moving body 10 includes an information processing apparatus 20, an output unit 10A, an external sensor 10B, an internal sensor 10C, a power controller 10G, and a power unit 10H.

The information processing apparatus 20 is, for example, a dedicated or general-purpose computer. The present embodiment illustrates a case where the information processing apparatus 20 is mounted on the moving body 10, as an example.

The moving body 10 is a movable object. The moving body 10 is, for example, a vehicle, a truck, a flying object (manned airplane, unmanned airplane (such as an unmanned aerial vehicle (UAV), and a drone), or a robot. The moving body 10 is, for example, a moving object traveling by a human's driving operation, or a moving object capable of automatically traveling (autonomous travelling) without human's driving operation. The present embodiment illustrates the case where the moving body 10 is a vehicle, as an example. The vehicle is, for example, a two-wheeled vehicle, a three-wheeled vehicle, or a four-wheeled vehicle. The present embodiment illustrates the case where the vehicle is an autonomous travelling four-wheeled vehicle, as an example.

The information processing apparatus 20 is not limited to the form of being mounted on the moving body 10. The information processing apparatus 20 may be mounted on a stationary object. The stationary object is an object fixed to the ground. The stationary object is an immovable object, or an object stationary to the ground. The stationary object is, for example, a guardrail, a pole, a parked vehicle, or a road sign. The information processing apparatus 20 may be mounted on a cloud server executing processing on a cloud.

The power unit 10H is a driving device mounted on the moving body 10. The power unit 10H is, for example, an engine, a motor, or wheels.

The power controller 10G controls the power unit 10H. The power unit 10H is driven by control of the power controller 10G. For example, the power controller 10G controls the power unit 10H, on the basis of information acquired from the external sensor 10B and the internal sensor 10C, and existence probability information derived by processing described later, to automatically drive the moving body 10. Controlling the power unit 10H controls the acceleration quantity, the braking quantity, and the steering angle and the like of the moving body 10. For example, the power controller 10G controls the vehicle to maintain the lane in which the vehicle is travelling, avoiding obstacles, and maintain the distance between the vehicle and the vehicle ahead at a predetermined distance or more.

The output unit 10A outputs various types of information. In the present embodiment, the output unit 10A outputs a rectangular coordinate map derived by the information processing apparatus 20. The rectangular coordinate map is a map indicating occupancy of obstacles in the rectangular coordinate space. The details of the rectangular coordinate map will be described in detail later.

The output unit 10A includes a communication function to transmit a rectangular coordinate map, a display function to display a rectangular coordinate map, and a sound output function to output sound indicating a rectangular coordinate map, and the like. For example, the output unit 10A includes at least one of a communication unit 10D, a display 10E, and a speaker 10F. The present embodiment illustrates an example in which the output unit 10A has a structure of including the communication unit 10D, the display 10E, and the speaker 10F.

The communication unit 10D transmits a rectangular coordinate map to another apparatus. For example, the communication unit 10D transmits a rectangular coordinate map to another apparatus through a publicly known communication line. The display 10E displays the rectangular coordinate map. The display 10E is, for example, a publicly known liquid crystal display (LCD), a projection apparatus, or a light. The speaker 10F outputs sound indicating the rectangular coordinate map.

The external sensor 10B is a sensor recognizing the external field around the moving body 10. The external sensor 10B may be mounted on the moving body 10, or mounted outside the moving body 10. The outside of the moving body 10 indicates, for example, another moving body or an external device.

The field around the moving body 10 is a region within a predetermined range from the moving body 10. The range is a range which the external sensor 10B is capable of observing. The range may be set in advance.

The external sensor 10B acquires observation information of the external field. The observation information is information indicating an observation result around a position in which the external sensor 10B is installed. According to the present embodiment, the observation information is information enabling derivation of positional information of each of a plurality of sensing points around the external sensor 10B (that is, the moving body 10).

The positional information of each of the sensing points is information indicating position of the sensing point in a real space. For example, the positional information of each of the sensing points is information indicating a distance from the external sensor 10B to the sensing point, and a direction of the sensing point with respect to the external sensor 10B serving as the reference point. The distance and the direction can be expressed with, for example, position coordinates indicating the relative position of the sensing point on the basis of the external sensor 10B, position coordinates indicating the absolute position of the sensing point, or a vector. Specifically, the positional information is expressed with polar coordinates or rectangular coordinates. The present embodiment illustrates the case where the positional information of the sensing point is indicated with polar coordinates, as an example.

The sensing points indicate respective points that are external to the moving body 10 and are observed individually by the external sensor 10B. For example, the external sensor 10B applies light to the field around the external sensor 10B, and receives reflected light reflected at reflection points. The reflection points correspond to the sensing points. A plurality of reflection points may be used as one sensing point.

The external sensor 10B acquires observation information including the light application direction (the direction of the sensing point with the external sensor 10B serving as the reference point) for each of a plurality of sensing points, and information relating to the reflected light reflected at each of the sensing points. The information relating to the reflected light is elapsed time from application of the light to reception of the reflected light, and/or intensity of the received light (or an attenuation rate of the received light for the intensity of the outgoing light). The external sensor 10B derives the positional information of each of the sensing points using the elapsed time and the like, and outputs the positional information to the information processing apparatus 20. The information processing apparatus 20 may derive the positional information of each of the sensing points from the observation information. The present embodiment illustrates the case where the external sensor 10B outputs the positional information of each of the sensing points to the information processing apparatus 20.

The external sensor 10B is, for example, an imaging device, a distance sensor (a millimeter-wave radar, or a laser sensor), or a sonar sensor detecting an object with sound waves. The imaging device acquires photographed image data (hereinafter referred to as photographed image) by photographing. The imaging device is a stereo camera, or a position specifying camera, or the like. The photographed image is digital image data specifying a pixel value for each of pixels, or a depth map specifying a distance from the external sensor 10B for each of pixels. The laser sensor is, for example, a two-dimensional laser imaging detection and ranging (LIDAR) sensor installed in parallel with the horizontal plane, or a three-dimensional LIDAR sensor.

The present embodiment illustrates a case where the external sensor 10B is an imaging device, as an example.

The present embodiment illustrates a case where the external sensor 10B is installed with the travelling direction of the moving body 10 serving as an imaging direction, as an example. For this reason, in the present embodiment, the external sensor 10B acquires positional information of each sensing point in the travelling direction (that is, the direction ahead) of the moving body 10.

The internal sensor 10C is a sensor observing information of the moving body 10 itself. The internal sensor 10C acquires self-position information. The self-position information includes the positional information of the moving body 10. The positional information of the moving body 10 is information indicating the current position of the moving body 10. The internal sensor 10C is, for example, an inertial measurement unit (IMU), a speed sensor, or a global positioning system (GPS), or the like. The positional information of the moving body 10 is expressed with world coordinates.

Figure 2:
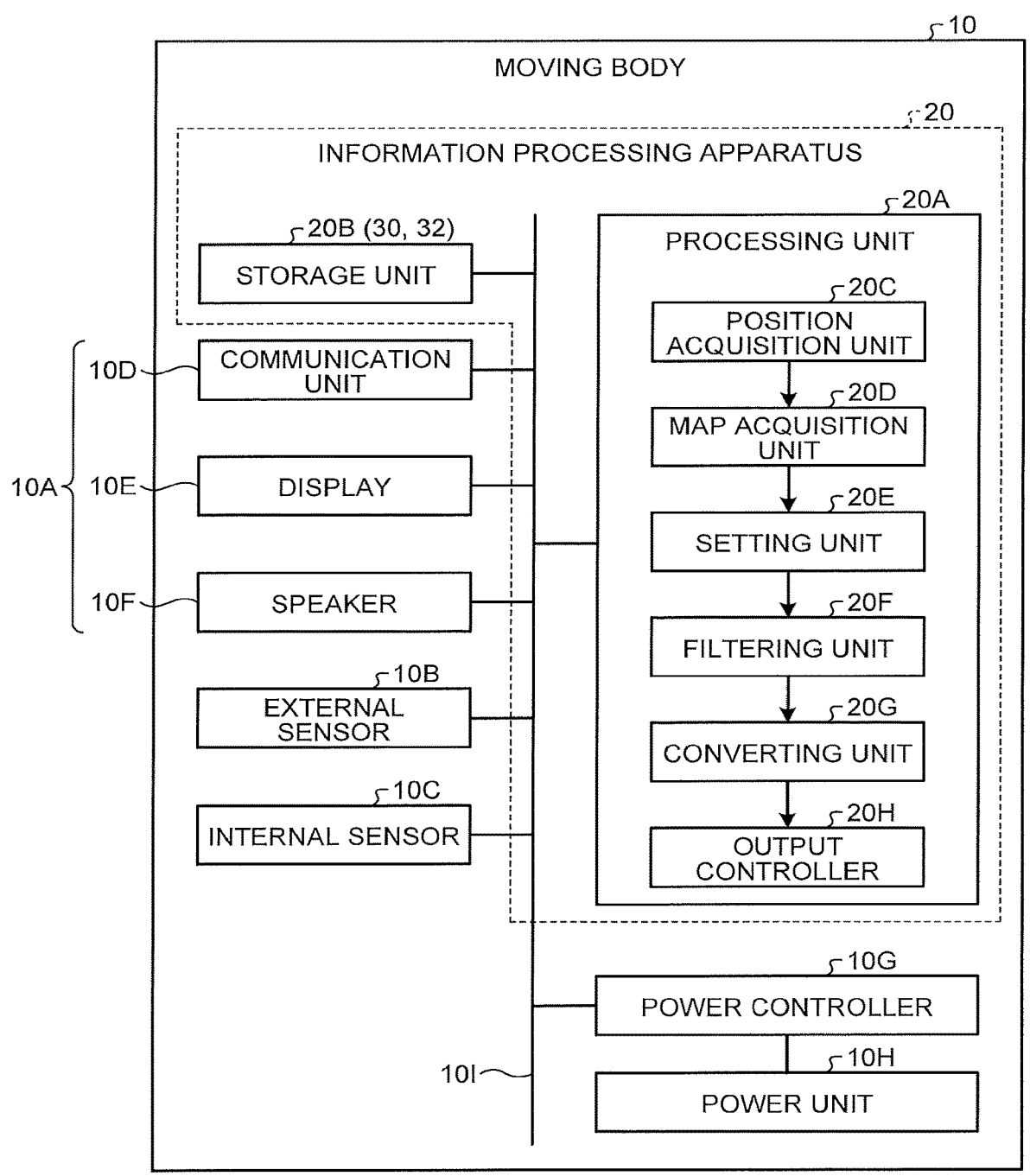
FIG. 2 is a block diagram illustrating a configuration of the moving body.

The following is a detailed explanation of an electrical configuration of the moving body 10. FIG. 2 is a block diagram illustrating an example of a configuration of the moving body 10.

The moving body 10 includes the information processing apparatus 20, the output unit 10A, the external sensor 10B, the internal sensor 10C, the power controller 10G, and the power unit 10H. As described above, the output unit 10A includes the communication unit 10D, the display 10E, and the speaker 10F.

The information processing apparatus 20, the output unit 10A, the external sensor 10B, the internal sensor 10C, and the power controller 10G are connected with a bus 10I. The power unit 10H may be connected with the power controller 10G.

The information processing apparatus 20 includes a storage unit 20B, and a processing unit 20A. Specifically, the output unit 10A, the external sensor 10B, the internal sensor 10C, the power controller 10G, the processing unit 20A, and the storage unit 20B are connected with the bus 10I.

The processing unit 20A may be connected with at least one of the storage unit 20B, the output unit 10A (the communication unit 10D, the display 10E, and the speaker 10F), the external sensor 10B, the internal sensor 10C, and the power controller 10G in a wired or wireless manner. The processing unit 20A may be connected with at least one of the storage unit 20B, the output unit 10A (the communication unit 10D, the display 10E, and the speaker 10F), the external sensor 10B, the internal sensor 10C, and the power controller 10G through a network.

The storage unit 20B stores therein various types of data. The storage unit 20B is, for example, a semiconductor memory device such as a random access memory (RAM) and a flash memory, a hard disk, or an optical disk. The storage unit 20B may be a storage device provided outside the information processing apparatus 20. The storage unit 20B may be a storage medium. Specifically, the storage medium may be a medium that stores or temporarily stores therein programs and/or various types of information downloaded through a local area network (LAN) or the Internet. The storage unit 20B may be configured of a plurality of storage media.

The processing unit 20A includes a position acquisition unit 20C, a map acquisition unit 20D, a setting unit 20E, a filtering unit 20F, a converting unit 20G, and an output controller 20H. For example, one or a plurality of processors achieve the position acquisition unit 20C, the map acquisition unit 20D, the setting unit 20E, the filtering unit 20F, the converting unit 20G, and the output controller 20H. For example, the units described above may be achieved by causing a processor such as a central processing unit (CPU) to execute a program, that is, software. The units described above may be achieved with a processor such as a dedicated integrated circuit (IC), that is, hardware. The units described above may be achieved using software and hardware together. In the case of using a plurality of processors, each of the processors may achieve one of the units, or two or more of the units.

The term "processor" used in the present embodiment means, for example, a CPU, a graphical processing unit (GPU), an application specific integrated circuit (ASIC), or circuits such as a programmable logic device (such as a simple programmable logic device (SPLD), a complex programmable logic device (CPLD), and a field programmable gate array (FPGA)).

The processor reads and executes a program stored in the storage unit 20B, to achieve each of the units. Instead of storing the program in the storage unit 20B, the program may be directly integrated into the circuit of the processor. In such a case, the processor reads and executes the program integrated into the circuit, to achieve each of the units.

The position acquisition unit 20C acquires position-related information. The position-related information includes at least positional information of each of sensing points. In the present embodiment, the position-related information includes positional information of each of sensing points, and self-position information.

In the present embodiment, the processing unit 20A performs processing described later using the position-related information and the like, to derive a rectangular coordinate map.

FIG. 3A to FIG. 3D are explanatory diagrams illustrating an example of derivation of a rectangular coordinate map. As illustrated in FIG. 3A, the external sensor 10B mounted on the moving body 10 acquires positional information of each of a plurality of sensing points P in a real space S. The position acquisition unit 20C acquires positional information of each of the sensing points P sensed by the external sensor 10B.

Specifically, the position acquisition unit 20C acquires positional information for each of sensing points P of the number corresponding to the density of the sensing points P that can be sensed by the external sensor 10B, that is, the resolution of the external sensor 10B. The positional information of each of the sensing points P is expressed with, for example, polar coordinates. The external sensor 10B may acquire three-dimensional information of each of the sensing points expressed with rectangular coordinates. When the positional information of each of the sensing points P is expressed with rectangular coordinates, the position acquisition unit 20C may transform the rectangular coordinates into polar coordinates.

The present embodiment illustrates the case where the position acquisition unit 20C acquires positional information expressed with polar coordinates, as the positional information of each of the sensing points P. Specifically, the positional information of each of the sensing points P is expressed with a distance r (also referred to as "moving radius") and an angle $\phi$ (also referred to as "declination") in the polar coordinate space. The angle $\phi$ is a direction with the position of the moving body 10 serving as the origin, in an xy plane (plane orthogonal to the vertical direction) along the estimated ground on which the moving body 10 is travelling.

In the present embodiment, the position of the moving body 10 and the current position of the moving body 10 indicate the current position of the moving body 10 on which the information processing apparatus 20 is mounted. Specifically, the positional information of the moving body 10 is information indicating the position (current position) of the moving body 10.

In the present embodiment, there are cases where the direction along the angle $\phi$ with the current position of the moving body 10 serving as the origin in the xy plane of the polar coordinate space is referred to as "angle direction". The xy plane in the polar coordinate space is a plane orthogonal to the moving radius direction of the polar coordinate space. The angle direction ($\phi$ direction) is a direction indicating an angle $\phi$ from the x axis or the y axis in two declinations ($\theta$, $\phi$) orthogonal to the moving radius direction of the polar coordinate space. In the present embodiment, the moving radius direction in the polar coordinate space is referred to as "distance direction". The moving radius direction is a direction (r direction) indicating a distance (distance r) to the sensing point P when the current position of the moving body 10 serves as the origin, and a direction extending along the moving radius axis.

Actually, the positional information of each of the sensing points P is further expressed with polar coordinates including the angle $\theta$. The angle $\theta$ is an angle with respect to a perpendicular line (z axis) for the xy plane along the estimated ground on which the moving body 10 is traveling. In the present embodiment, the angle $\theta$ is not considered, and description thereof is omitted.

The position acquisition unit 20C may acquire positional information of each of the sensing points P from an external device. In such a case, the position acquisition unit 20C may acquire positional information of each of the sensing points P from an external device through the communication unit 10D.

The self-position information includes positional information of the moving body 10. In the present embodiment, the position acquisition unit 20C acquires self-position information from the internal sensor 10C. The positional information of the moving body 10 is expressed with, for example, world coordinates.

The position acquisition unit 20C outputs position-related information including positional information of each of the sensing points P and the self-position information to the map acquisition unit 20D.

Explanation will be continued with reference to FIG. 2 again. The following is an explanation of the map acquisition unit 20D. The map acquisition unit 20D acquires a polar coordinate map.

FIG. 3B is a schematic diagram illustrating an example of a polar coordinate map M1.

The polar coordinate map M1 is a map specifying the first occupancy of the target in a polar coordinate space S1. In the present embodiment, the polar coordinate map M1 is a map specifying the first occupancy of the target in divided regions G in the polar coordinate space S1.

The target is an object serving as a target for which occupancy is to be specified. The target may be properly set in accordance with the type of the moving body 10 on which the information processing apparatus 20 is mounted. The target is, for example, an obstacle. The obstacle is an object obstructing traveling of the moving body 10 provided with the information processing apparatus 20. The obstacle is, for example, a three-dimensional object such as another vehicle, a building, and a wall, a physical obstacle such as a hole and a pond, or a theoretical boundary determined in advance.

The first occupancy indicates an occupancy of the target specified in the polar coordinate map M1. In the present embodiment, the first occupancy is an occupancy of the target specified for each of the divided regions G in the polar coordinate map M1. The occupancy of the target is a degree with which the target occupies the divided region G. The occupancy of the target may be an existence probability of the target existing in the divided region G. The occupancy is expressed with, for example, a value of 0.0 to 1.0.

The polar coordinate space S1 is a space specified with the distance direction and the angle direction. Specifically, the polar coordinate space S1 is a space specified with one moving radius (distance r) and two declinations (angle $\phi$, and angle $\theta$). As described above, the present embodiment illustrates the polar coordinate space S1 as a space specified with the distance direction indicating the distance r, and the angle direction indicating the angle $\phi$.

The divided regions G are regions obtained by dividing the polar coordinate space S1 into a plurality of regions. Specifically, the divided regions G are regions obtained by dividing a r$\phi$ plane specified with the distance r and the angle $\phi$ in the polar coordinate space S1 around the moving body 10 into a plurality of regions in a lattice shape. The shape of each of the divided regions G is not limited. For example, the shape of each of the divided regions G is a rectangular shape. The shape of each of the divided regions G is not limited to a square. For example, the shape of each of the divided regions G may be an oblong.

The size of each of the divided regions G is not limited. For example, the size of each of the divided regions G is equal to or larger than the size of each sensing point P acquired by the external sensor 10B. Specifically, the size of each of the divided regions G may be equal to the size of a sensing point P. As another example, the size of each of the divided regions G may be a size capable of including a plurality of sensing points P. Specifically, the size of each of the divided regions G may be equal to the size corresponding to the sensor resolution serving as the maximum density of sensing points P that can be acquired by the external sensor 10B. The size of each of the divided regions G may be a size larger than the size corresponding to the sensor resolution. The maximum size of each of the divided regions G may be properly adjusted according to the unit of the existence probability of obstacles.

The present embodiment illustrates a case where the size of each of the divided regions G is equal to or larger than that of each of sensing points P acquired by the external sensor 10B. Specifically, the present embodiment illustrates a case where the resolution indicated with the density of the divided regions G in the polar coordinate map M1 is equal to or smaller than the sensor resolution of the external sensor 10B.

In the present embodiment, the storage unit 20B stores therein divided region information 30 in advance. The divided region information 30 is information indicating the size and the position of each of the divided regions G obtained by dividing the polar coordinate space S1 into a plurality of divided regions G.

In the present embodiment, the map acquisition unit 20D generates a polar coordinate map M1 on the basis of positional information of sensing points P, to acquire the polar coordinate map M1.

Specifically, the map acquisition unit 20D generates a polar coordinate map M1 using the self-position information of the moving body 10, the divided region information 30, and the positional information of the sensing points P acquired from the position acquisition unit 20C. In this manner, the map acquisition unit 20D acquires the polar coordinate map M1.

Specifically, the map acquisition unit 20D arranges a grid indicating divided regions G indicated in the divided region information 30, in the polar coordinate space S1 with the current position of the moving body 10 set to distance $r_0$. The map acquisition unit 20D arranges sensing points P acquired by the position acquisition unit 20C in the polar coordinate space S1, in positions indicated with the pieces of positional information of the respective sensing points P. The distance $r_0$ indicates the distance r of 0.

In addition, the map acquisition unit 20D specifies the first occupancy of the target, for each of the divided regions G in the polar coordinate space S1, in accordance with the sensing points P included in the divided region G. A publicly known method may be used as the method for specifying the first occupancy.

For example, the map acquisition unit 20D specifies a sensing point P disposed in a position closest to the moving body 10, for each of the angle directions ($\phi$ directions) with the moving body 10 serving as the origin, in the polar coordinate space S1.

Thereafter, the map acquisition unit 20D specifies high occupancy as the first occupancy for the divided region G including the sensing point P. The high occupancy is, for example, the maximum value "1.0" of the occupancy. The divided region G for which the high occupancy is specified is a region that can be determined to be a region in which "target exists".

The map acquisition unit 20D also specifies low occupancy as the first occupancy for the divided regions G adjacent to the moving body 10 side to the divided region G including the sensing point P. The low occupancy is, for example, the minimum value "0.0" of the occupancy. The divided region G for which the low occupancy is specified is a region that can be determined to be a region in which "no target exists".

The map acquisition unit 20D also specifies middle occupancy as the first occupancy for the divided regions G present on a side distant from the moving body 10 to the divided region G including the sensing point P. The middle occupancy is, for example, a middle value "0.5" between the maximum value and the minimum value. The divided region G for which middle occupancy is specified is a region in which "it is unclear whether the target exists".

In this manner, the map acquisition unit 20D generates a polar coordinate map M1 specifying the first occupancy of the target for each of the divided regions G in the polar coordinate space S1.

For example, the map acquisition unit 20D acquires the polar coordinate map M1 illustrated in FIG. 3B using the positional information of sensing points P illustrated in FIG. 3A.

In FIG. 3B, in the divided regions G, white regions 40B indicate that low occupancy (first occupancy) is specified for the regions. In FIG. 3B, regions 40A with oblique lines indicate that high occupancy (first occupancy) is specified for the regions. In FIG. 3B, regions 40C indicate that middle occupancy (first occupancy) is specified for the regions.

The map acquisition unit 20D may acquire the polar coordinate map M1 from an external device. Specifically, the map acquisition unit 20D may acquire the polar coordinate map M1 specifying the first occupancy of the target for each of the divided regions G in the polar coordinate space S1, from an external device.

In such a case, the external device may generate the polar coordinate map M1 using positional information of each of the sensing points P and the divided region information 30. In addition, the map acquisition unit 20D may acquire the polar coordinate map M1 from the external device through the communication unit 10D.

Explanation will be continued with reference to FIG. 2 again. The setting unit 20E sets a filtering window of a size corresponding to the distance r from the reference position C to the polar coordinate map M1. In the present embodiment, the setting unit 20E sets a filtering window of a size corresponding to the distance r of the reference position C, for each of the divided regions G in the polar coordinate map M1.

The reference position C can be determined in advance. In the present embodiment, the reference position C is the current position of the moving body 10 in the polar coordinate space S1. Specifically, the reference position C is the position of the distance $r_0$ in the polar coordinate space S1.

The setting unit 20E sets a filtering window for each of the divided regions G, in accordance with the distance r from the reference position C, for each of the divided regions G included in the polar coordinate map M1.

The filtering window is a processing unit at the time when the first occupancy of the noted divided region G is subjected to filtering using the first occupancies of other divided region G around the noted divided region G.

In the present embodiment, the setting unit 20E sets a filtering window of a size corresponding to the distance r from the reference position C (the position of the distance $r_0$), for each of the divided regions G in the polar coordinate space S1.

Specifically, the setting unit 20E sets a filtering window of a larger size, as the distance r from the reference position is smaller in the polar coordinate space S1. In the present embodiment, the setting unit 20E sets a filtering window for each of the divided regions G. In this state, the setting unit 20E sets a filtering window of a larger size for a divided region G closer to the current position of the moving body 10 in the polar coordinate space S1. Specifically, the setting unit 20E sets a filtering window F of a larger size for a divided region G with the distance r closer to the distance $r_0$ serving as the current position of the moving body 10.

Incidentally, the setting unit 20E preferably sets filtering windows having sizes that are fixed in the distance direction (r direction) in the polar coordinate space S1 and are different in the angle direction (φ direction).

The setting unit 20E sets a filtering window having a size in the angle direction (φ direction) inversely proportional to the distance r from the moving body 10 serving as the reference position C, in the polar coordinate space S1. Specifically, the setting unit 20E sets a filtering window of a larger size in the angle direction as the filtering window is closer to the moving body 10 (reference position).

For example, as illustrated in FIG. 3C, the setting unit 20E sets a filtering window F with a 7×1 size with the number "7" of divided regions G in the angle direction and the number "1" of a divided region G in the distance direction, for the divided regions G existing in the position of a distance $r_1$ closest to the distance $r_0$.

For another example, the setting unit 20E sets a filtering window F with a 3×1 size with the number "3" of divided regions G in the angle direction and the number "1" of a divided region G in the distance direction, for each of the divided regions G existing in the positions of a distance $r_2$ and a distance $r_3$.

For another example, the setting unit 20E sets a filtering window F with a 1×1 size with the number "1" of divided region G in the angle direction and the number "1" of a divided region G in the distance direction, for each of the divided regions G existing in the positions of a distance $r_4$ and a distance $r_5$.

It suffices that the setting unit 20E at least sets a filtering window F with a larger size for the divided region G closer to the moving body 10 serving as the reference position C in the polar coordinate space S1, and the sizes are not limited to the sizes described above.

The setting unit 20E may store filtering windows F of sizes satisfying the conditions described above and corresponding to the distance r from the reference position C, in the storage unit 20B in advance. In such a case, the setting unit 20E may read and set a filtering window F of a size corresponding to the distance r from the reference position C from the storage unit 20B, for each of the divided regions G included in the polar coordinate map M1.

With reference to FIG. 2 again, the filtering unit 20F will be explained. The filtering unit 20F subjects the polar coordinate map M1 to filtering using the filtering windows F. In the present embodiment, the filtering unit 20F uses the filtering window F, to derive second occupancy from the first occupancy of each of the divided regions G for the filtering window F.

The filtering unit 20F subjects the polar coordinate map M1 to filtering using the filtering windows F set by the setting unit 20E. In the present embodiment, the filtering unit 20F performs filtering using the filtering window F on each of the divided regions G for which the filtering window F of a size corresponding to the distance r is set by the setting unit 20E. Thereafter, the filtering unit 20F uses the occupancy derived by filtering as the second occupancy. In this manner, the filtering unit 20F derives the second occupancy from the first occupancy using the filtering window F of the set size, for each of the divided regions G included in the polar coordinate map M1.

The second occupancy is an occupancy obtained after changing the first occupancy specified for the divided region G by performing filtering using the filtering window F of the size set for the divided region G.

The filter used for filtering is not limited. Specifically, the filter may be any filter enabling derivation of the second occupancy of the divided region G for which the filtering window F is set, using the first occupancy specified for the divided region G in the filtering window F. In the present embodiment, the maximum value filter or the minimum value filter is used for filtering.

The maximum value filter is a filter to expand and emphasize the highest first occupancy among the first occupancies specified for the respective divided regions G included in the filtering window F. Specifically, when filtering is performed using the maximum value filter, the highest first occupancy among the first occupancies of the divided regions G included in the filtering window F is used as the second occupancy.

The minimum value filter is a filter used for outputting the lowest first occupancy among the first occupancies specified for the respective divided regions G included in the filtering window F. Specifically, when filtering is performed using the minimum value filter, the lowest first occupancy among the first occupancies of the divided regions G included in the filtering window F is used as the second occupancy.

Figure 4A:
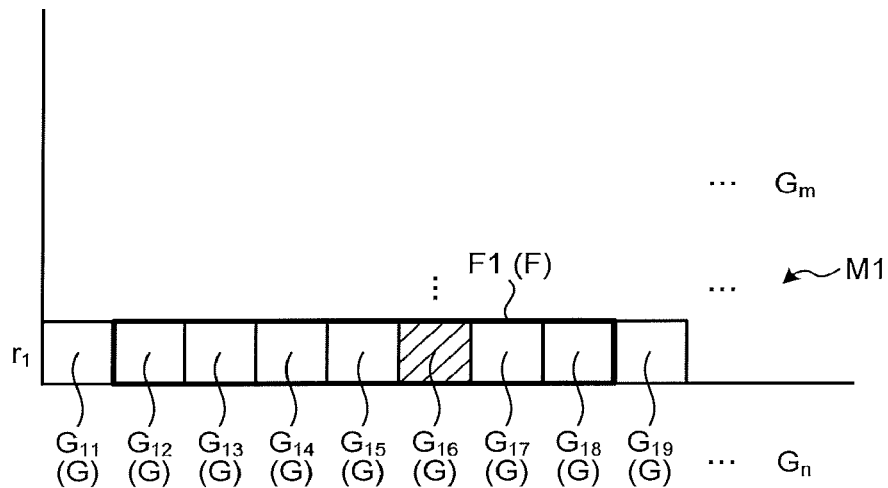
FIG. 4A and FIG. 4B are explanatory diagrams of filtering.
Figure 4B:
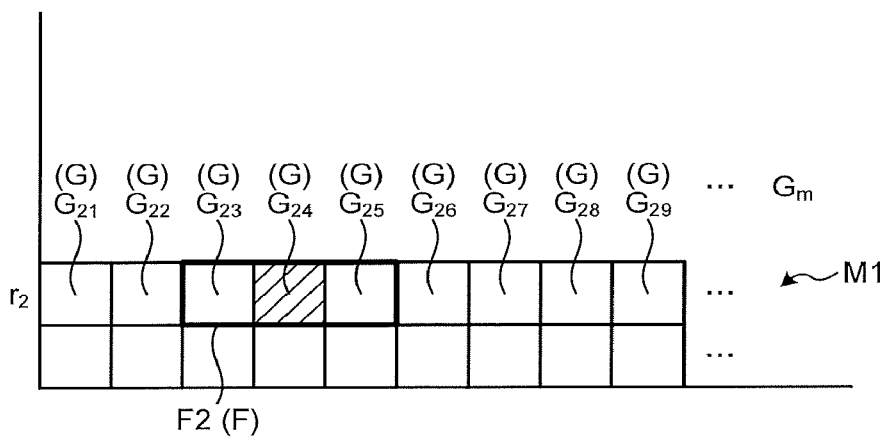

FIG. 4A and FIG. 4B are explanatory diagrams of filtering. The filtering unit 20F successively sets each of the divided regions G included in the polar coordinate map M1, as the divided region G serving as the processing target. The filtering unit 20F specifies the filtering window F of the size set for the divided region G serving as the processing target.

As illustrated in FIG. 4A, suppose that the setting unit 20E sets a filtering window F with a 7×1 size with the number "7" of divided regions G in the angle direction and the number "1" of a divided region G in the distance direction, for each of the divided region $G_{11}$ to the divided region $G_n$ (n is an integer) arranged in the position of the distance $r_1$. In such a case, the filtering unit 20F performs filtering using the filtering window F of the 7×1 size, on each of the divided regions G arranged in the position of the distance $r_1$.

For example, suppose that the divided region $G_{15}$ in the distance $r_1$ is subjected to filtering. In addition, suppose that the filtering window F1 of the 7×1 size is set for the divided region $G_{15}$.

In this case, the filtering unit 20F disposes the filtering window F1 of the 7×1 size such that the divided region $G_{15}$ is disposed in the center. Thereafter, the filtering unit 20F derives the second occupancy of the divided region $G_{15}$ by filtering from the first occupancy set for each of the divided regions G (divided region $G_{11}$ to divided region $G_{19}$) in the filtering window F1.

As illustrated in FIG. 4B, suppose that the setting unit 20E sets a filtering window F with a 3×1 size with the number "3" of divided regions G in the angle direction and the number "1" of a divided region G in the distance direction, for each of the divided region $G_{21}$ to the divided region $G_m$ (m is an integer) arranged in the position of the distance $r_2$. In such a case, the filtering unit 20F performs filtering using the filtering window F of the 3×1 size, on each of the divided regions G arranged in the position of the distance $r_2$.

For example, suppose that the divided region $G_{24}$ in the distance $r_2$ is subjected to filtering. In addition, suppose that the filtering window F2 of the 3×1 size is set for the divided region $G_{24}$.

In this case, the filtering unit 20F disposes the filtering window F2 of the 3×1 size such that the divided region $G_{24}$ is disposed in the center. Thereafter, the filtering unit 20F derives the second occupancy of the divided region $G_{24}$ by filtering from the first occupancy set for each of the divided regions G (divided region $G_{23}$ to divided region $G_{25}$) in the filtering window F2.

The filtering unit 20F may perform dilation processing the number of times corresponding to the size of the filtering window F, as filtering.

For example, the filtering unit 20F executes the processing of replacing the first occupancies of the adjacent divided regions G with the maximum value of the first occupancies thereof, for a plurality of divided regions G included in the filtering window F. The number of times of the processing corresponds to the size of the filtering window F. In this manner, the filtering unit 20F may derive the second occupancy.

Specifically, suppose that filtering is performed using a filtering window F of a 3×1 size with the number "3" of divided regions G in the angle direction and the number "1" of a divided region G in the distance direction. In such a case, filtering using the maximum value filter for the filtering window F of the 3×1 size agrees with a result (second occupancy) obtained by dilation processing performed on the two divided regions G adjacent to the divided region G serving as the processing target on the left and the right sides in the angle direction, with respect to the divided region G serving as the processing target.

In addition, suppose that filtering is performed using a filtering window F of a 5×1 size with the number "5" of divided regions G in the angle direction ϕ and the number "1" of a divided region G in the distance direction. In such a case, filtering using the maximum value filter for the filtering window F of the 5×1 size agrees with a result obtained by dilation processing performed twice on 3×1 divided regions G, with respect to the divided region G serving as the processing target.

As described above, the filtering unit 20F may derive the second occupancy for each of the divided regions G of the polar coordinate map M1, by performing dilation processing of the number of times corresponding to the size of the filtering window F.

Explanation will be continued with reference to FIG. 3 again. As described above, the filtering unit 20F derives the second occupancy from the first occupancy, for each of the divided regions G, using the filtering window F of the size set by the setting unit 20E.

In this manner, the filtering unit 20F generates a polar coordinate map M'1 in which the second occupancy is specified for each of the divided regions G (see FIG. 3D), from the polar coordinate map M1 in which the first occupancy is specified for each of the divided regions G.

As illustrated in FIG. 3D, in the polar coordinate map M'1, a region 40A for which high occupancy is specified is more expanded as the distance r from the moving body 10 is smaller, in comparison with the polar coordinate map M1 before filtering.

Explanation will be continued with reference to FIG. 2 again. The converting unit 20G converts the polar coordinate map M'1 serving as the filtered polar coordinate map M1 into a rectangular coordinate space. Specifically, the converting unit 20G converts the polar coordinate map M'1 specifying the second occupancy for each of the divided regions G into a rectangular coordinate space.

Figure 5A:
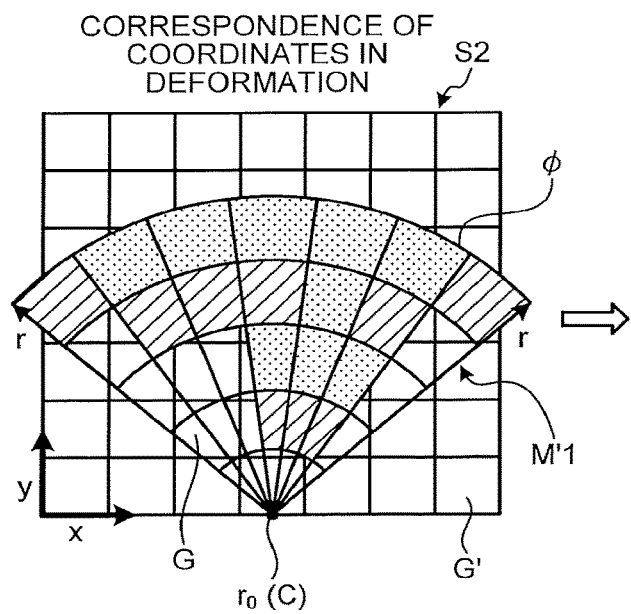
FIG. 5A and FIG. 5B are explanatory diagrams of derivation of a rectangular coordinate map.
Figure 5B:
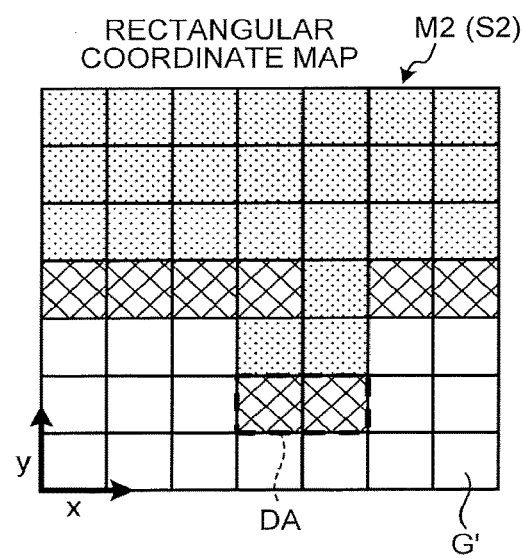

FIG. 5A and FIG. 5B are explanatory diagrams illustrating an example of derivation of a rectangular coordinate map M2.

FIG. 5A is a diagram in which the polar coordinate map M'1 is disposed in a rectangular coordinate space S2. As illustrated in FIG. 5A, the polar coordinate map M'1 indicated with the polar coordinate space S1 has a shape converging toward the reference position C (position of the distance $r_0$) and spreading toward a direction going away from the reference position C, in the rectangular coordinate space S2.

The converting unit 20G sets an occupancy of each of the divided regions G' in the rectangular coordinate space S2 using the second occupancy specified for corresponding one or a plurality of divided regions G in the polar coordinate map M'1.

The divided regions G' are regions obtained by dividing the rectangular coordinate space S2 into a plurality of regions. Specifically, the divided regions G' are regions obtained by dividing a plane (xy plane) orthogonal to the vertical direction in the rectangular coordinate space S2 around the moving body 10 into a plurality of regions in a grid shape. The shape of each of the divided regions G' is not limited. For example, the shape of each of the divided regions G' is a rectangular shape. The shape of each of the divided regions G' is not limited to a square. For example, the shape of each of the divided regions G' may be an oblong shape.

The size of each of the divided regions G' is not limited. For example, the size of each of the divided regions G' is equal to or larger than the size of each of sensing points P acquired by the external sensor 10B. Specifically, the size of each of the divided regions G' may be equal to the size of a sensing point P. As another example, the size of each of the divided regions G' may be a size capable of including a plurality of sensing points P. Specifically, the size of each of the divided regions G' may be equal to the size corresponding to the sensor resolution of the external sensor 10B, or larger than the size corresponding to the sensor resolution.

The size of each of the divided regions G' may be set in advance in accordance with the minimum size or the maximum size at the time when the divided regions G of the polar coordinate map M1 are converted into the rectangular coordinate space S2. For example, the size of each of the divided regions G' is a size larger than the minimum size and smaller than the maximum size at the time when the divided regions G of the polar coordinate map M1 are converted into the rectangular coordinate space S2. The size of each of the divided regions G' is not limited to these ranges.

In the present embodiment, the storage unit 20B stores therein divided region information 32 in advance. The divided region information 32 is information indicating the size and the position of each of the divided regions G' obtained by dividing the rectangular coordinate space S2 into a plurality of divided regions G'.

The converting unit 20G sets occupancy of each of the divided regions G' in the rectangular coordinate space S2 using the second occupancy specified for corresponding one or a plurality of divided regions G in the polar coordinate map M'1. For example, the converting unit 20G sets the occupancy of each of the divided regions G' of the rectangular coordinate space S2 to the second occupancy specified for the divided region G disposed in the closest position in the polar coordinate map M'1. For example, the converting unit 20G may perform this setting using the nearest neighbor method.

The converting unit 20G interpolates the second occupancies of the divided regions G located in the vicinity among the divided regions G in the polar coordinate map M'1, for each of the divided regions G' in the rectangular coordinate space S2, using the bilinear method. In this manner, the converting unit 20G may set the occupancy of obstacles in each of the divided regions G' of the rectangular coordinate space S2.

Incidentally, these methods are examples of coordinate transformation from the polar coordinate space S1 into the rectangular coordinate space S2, and are not limited thereto. For example, the nearest neighbor algorithm, the bicubic method, or the area average method may be used for coordinate transformation, as well as the methods described above.

FIG. 5B is a schematic diagram in which the polar coordinate map M'1 illustrated in FIG. 5A is converted into the rectangular coordinate map M2 of the rectangular coordinate space S2. The rectangular coordinate map M2 is obtained by performing coordinate transformation of the polar coordinate map M'1, obtained by filtering the polar coordinate map M1 using the filtering windows F of sizes corresponding to the distance r from the reference position C, into the rectangular coordinate space S2.

For this reason, as illustrated in FIG. 5B, reduction in occupancy is suppressed even in the divided region G' close to the reference position C.

Figure 6A:
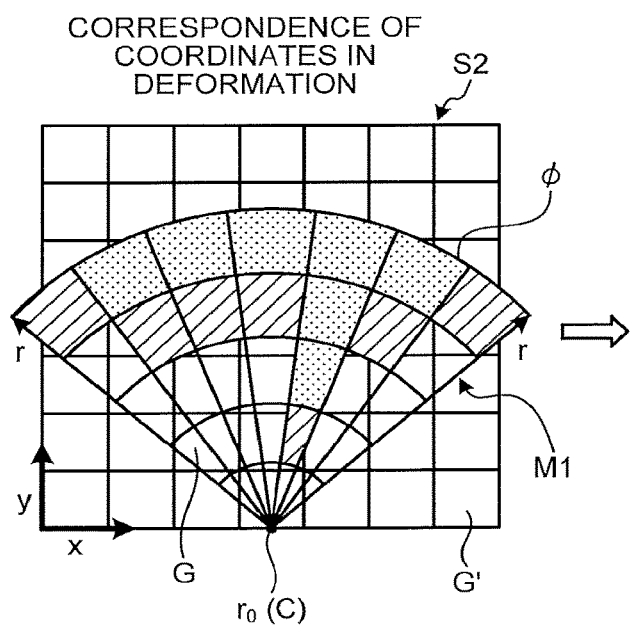
FIG. 6A and FIG. 6B are explanatory diagrams of a conventional method.
Figure 6B:
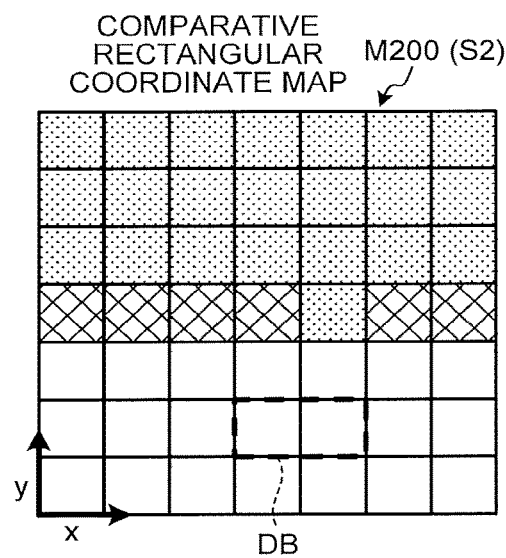

The following is an explanation of a conventional method. FIG. 6A and FIG. 6B are explanatory diagrams of the conventional method.

In conventional art, the filtering of the present embodiment is not performed. In addition, a conventional art performs no setting of filtering windows F of sizes corresponding to the distance from the reference position C. For this reason, in the conventional art, the polar coordinate map M1 (see FIG. 3B) that is not subjected to filtering using filtering windows F is directly converted into the rectangular coordinate space S2.

FIG. 6A is a diagram in which the polar coordinate map M1 (see FIG. 3B) is disposed in the rectangular coordinate space S2. As illustrated in FIG. 6A, the polar coordinate map M1 indicated with the polar coordinate space S1 has a shape converging toward the reference position C (position of the distance $r_0$) and spreading toward a direction of going away from the reference position C, in the polar coordinate space S2.

As described above, among the divided regions G in the polar coordinate map M1, the divided region G disposed in a position closer to the reference position C is deformed and reduced with a larger degree. For this reason, when the polar coordinate map M1 is subjected to coordinate transformation into the rectangular coordinate space S2, a comparative rectangular coordinate map M200 illustrated in FIG. 6B is obtained in the conventional art.

As illustrated in FIG. 6B, the comparative rectangular coordinate map M200 is a map obtained by converting the same polar coordinate map M1 as the polar coordinate map M1 (see FIG. 3B) used in the present application into the rectangular coordinate space S2 without filtering.

For this reason, in the comparative rectangular coordinate map M200 (see FIG. 6B) derived in the conventional method, the occupancy specified for the divided region G is markedly reduced by coordinate transformation as the position is closer to the reference position C. For this reason, in the comparative rectangular coordinate map M200, there are cases where a value is specified to such a degree that the occupancy is determined to indicate that "no target exists".

For example, as illustrated in FIG. 6B, in the comparative rectangular coordinate map M200 derived by the conventional method, the region DA is provided with the occupancy determined as indicating that "no target exists" (see region DB), while occupancy determined to indicate that "a target exists" is specified for the region DA in the rectangular coordinate map M2 (see FIG. 5B) derived using the method of the present embodiment. For this reason, the conventional method has insufficient reliability of the occupancy of the target.

By contrast, in the information processing apparatus 20 according to the present embodiment, the setting unit 20E sets a filtering window F of a size corresponding to the distance r from the reference position C, for each of the divided regions G included in the polar coordinate map M1. Thereafter, the filtering unit 20F performs filtering using the filtering window F of the set size for each of the divided regions G in the polar coordinate map M1, to derive the polar coordinate map M'1 specifying the second occupancies. Thereafter, the converting unit 20G subjects the polar coordinate map M'1 to coordinate transformation into the rectangular coordinate space S2, to derive the rectangular coordinate map M2.

With the structure, the information processing apparatus 20 according to the present embodiment is enabled to suppress marked reduction in occupancy specified in the polar coordinate map M1 due to deformation and reduction of the divided regions G occurring in coordinate transformation from the polar coordinate space S1 to the rectangular coordinate space S2.

Explanation is continued with reference to FIG. 2 again. The output controller 20H outputs the rectangular coordinate map M2 converted by the converting unit 20G to the power controller 10G.

The output controller 20H outputs the rectangular coordinate map M2. Specifically, the output controller 20H outputs the rectangular coordinate map M2 specifying the second occupancy of the target for each of the divided regions G' in the rectangular coordinate space S2 to the power controller 10G controlling the power unit 10H of the moving body 10.

The output controller 20H displays the rectangular coordinate map M2 on the display 10E. In the present embodiment, the output controller 20H displays a display screen including the rectangular coordinate map M2 on the display 10E.

Figure 7:
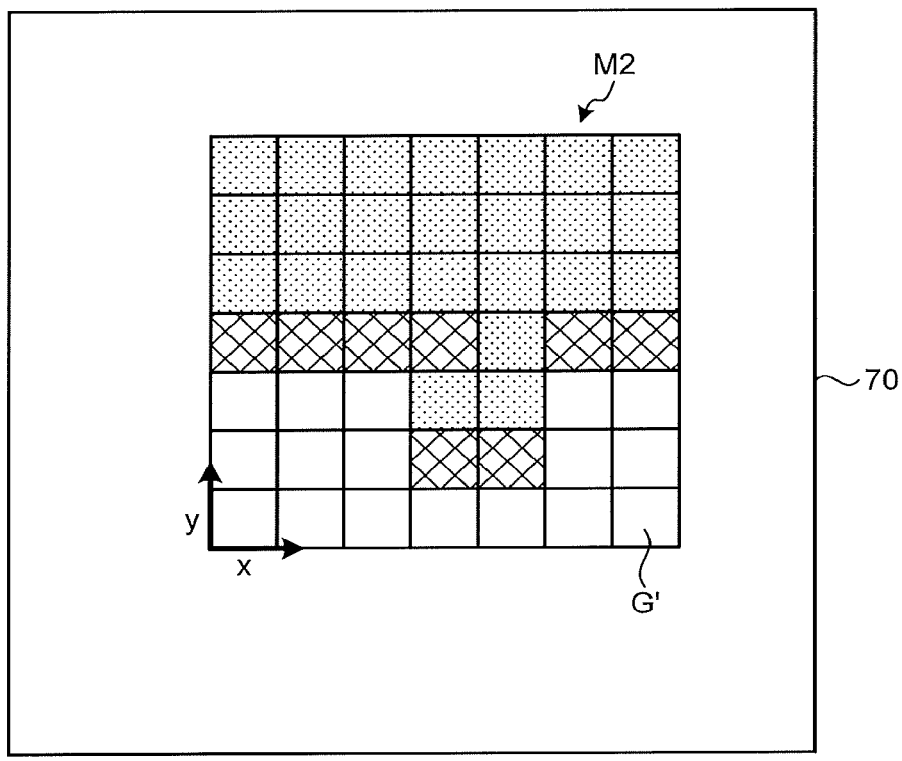
FIG. 7 is a schematic diagram illustrating a display screen.

FIG. 7 is a schematic diagram illustrating an example of a display picture 70. The display screen 70 includes the rectangular coordinate map M2 converted by the converting unit 20G. Specifically, the display screen 70 includes the rectangular coordinate map M2 obtained by filtering the polar coordinate map M1 specifying the occupancies of the target using filtering windows F of the sizes corresponding to the distance r from the reference position C, and thereafter converting the polar coordinate map M1 into the rectangular coordinate space S2. This structure enables the user to easily recognize the occupancy of the target by checking the display screen 70.

Explanation will be continued with reference to FIG. 2 again. The output controller 20H may control the display 10E and/or the speaker 10F to output sound and/or light indicating the occupancy for each of the divided regions G' illustrated in the rectangular coordinate map M2. The output controller 20H may transmit the rectangular coordinate map M2 to an external device through the communication unit 10D.

The output controller 20H may output the rectangular coordinate map M2 to the power controller 10G.

In such a case, the power controller 10G controls the power unit 10H in accordance with the rectangular coordinate map M2 received from the output controller 20H. For example, the power controller 10G may generate a power control signal to control the power unit 10H, in accordance with the rectangular coordinate map M2, to control the power unit 10H. The power control signal is a control signal to control the driving unit performing drive relating to travelling of the moving body 10 in the power unit 10H. For example, the power controller 10G controls the steering, the engine, or the like, of the moving body 10 such that the moving body 10 travels the region of the real space S corresponding to the divided region G' indicating the occupancy indicating that the region is a travelable region indicated in the rectangular coordinate map M2.

Figure 8:
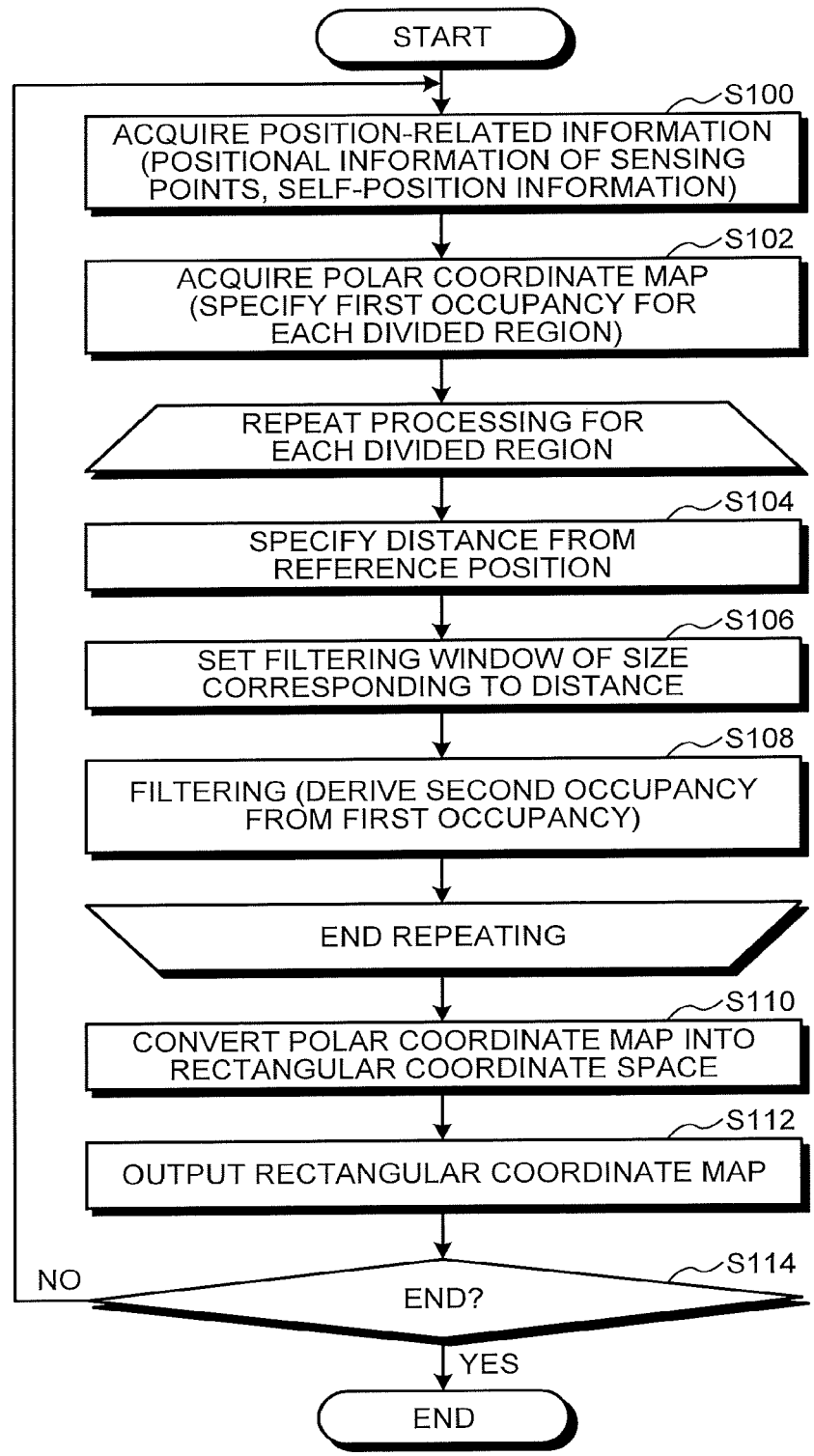
FIG. 8 is a flowchart illustrating a procedure of information processing.

The following is an explanation of an example of a process of information processing executed in the information processing apparatus 20 according to the present embodiment. FIG. 8 is a flowchart illustrating an example of a process of information processing executed in the information processing apparatus 20 according to the present embodiment.

First, the position acquisition unit 20C acquires position-related information (Step S100). Thereafter, the map acquisition unit 20D generates a polar coordinate map M1 using the position-related information acquired at Step S100. In this manner, the map acquisition unit 20D acquires a polar coordinate map M1 (Step S102).

Thereafter, the setting unit 20E executes processing of Step S104 to Step S108 for each of divided regions G included in the polar coordinate map M1 acquired at Step S102.

At Step S104, the setting unit 20E specifies the distance r from the reference position C (position of the distance $r_0$, that is, the position of the moving body 10) for the divided region G serving as the processing target (Step S104).

Thereafter, the setting unit 20E sets a filtering window F of a size corresponding to the distance r specified at Step S104, for the divided region G serving as the processing target (Step S106).

Thereafter, the setting unit 20E performs filtering on the divided region G serving as the processing target using the filtering window F of the size set at Step S106 (Step S108). At Step S108, the setting unit 20E derives second occupancy serving as the occupancy of the divided region G serving as the processing target, from the first occupancy of the divided region G included in the filtering window F set at Step S106.

When the setting unit 20E executes the processing of Step S104 to Step S108 for all the divided regions G included in the polar coordinate map M1 acquired at Step S102, the process proceeds to Step S110. By the processing of Step S104 to Step S108, the second occupancy is specified for each of all the divided regions G included in the polar coordinate map M1. Specifically, the processing of Step S104 to Step S108 produces a polar coordinate map M'1 specifying the second occupancy of the target for each of the divided regions G.

The converting unit 20G converts the polar coordinate map M'1 obtained by the processing of Step S104 to Step S108 into the rectangular coordinate space S2 (Step S110).

Thereafter, the output controller 20H outputs a rectangular coordinate map M2 generated by the conversion processing at Step S110 to at least one of the output unit 10A and the power controller 10G (Step S112).

Thereafter, the processing unit 20A determines whether to end the processing (Step S114). When affirmative determination is made at Step S114 (Step S114: Yes), the routine is ended. When negative determination is made at Step S114 (Step S114: No), the process returns to Step S100 described above.

As described above, the information processing apparatus 20 according to the present embodiment includes the map acquisition unit 20D, the filtering unit 20F, and the converting unit 20G. The map acquisition unit 20D acquires a polar coordinate map M1 specifying the first occupancy of the target in the polar coordinate space S1. The filtering unit 20F performs filtering on the polar coordinate map M1 using filtering windows F of sizes corresponding to the distance from the reference position C. The converting unit 20G converts the polar coordinate map M'1 serving as the filtered polar coordinate map M1 into the rectangular coordinate space S2.

As described above, the information processing apparatus 20 according to the present embodiment sets filtering windows F of sizes corresponding to the distance r from the reference position C for the polar coordinate map M1, before coordinate transformation into the rectangular coordinate space S2, and performs filtering using the set filtering windows F. In addition, the information processing apparatus 20 converts the filtered polar coordinate map M1 (polar coordinate map M'1) into the rectangular coordinate space S2.

With this structure, the information processing apparatus 20 according to the present embodiment is enabled to suppress occurrence of a region in which the specified occupancy is markedly reduced in the polar coordinate map M1, due to deformation and reduction occurring in coordinate transformation from the polar coordinate space S1 to the rectangular coordinate space S2.

Accordingly, the information processing apparatus 20 according to the present embodiment is enabled to improve the reliability of the occupancy of the target.

In the present embodiment, the setting unit 20E sets filtering windows F of sizes corresponding to the distance r from the reference position C to the polar coordinate map M1. In addition, the setting unit 20E sets a filtering window F of a larger size as the distance r from the reference position C in the polar coordinate space S1 is smaller.

As described above, among the divided regions G in the polar coordinate map M1, the divided region G disposed in a position closer to the reference position C is deformed and reduced with a larger degree at the time of coordinate transformation into the rectangular coordinate space S2. For this reason, a filtering window F of a larger size is set, as the distance r from the reference position C in the polar coordinate space S1 is smaller. This structure effectively suppresses reduction in occupancy due to coordinate transformation, even in the divided region G' closer to the reference position C.

As explained with reference to FIG. 5A, when the polar coordinate map M'1 is disposed in the rectangular coordinate space S2, the angle direction (φ direction) in the polar coordinate map M'1 is indicated with an arc in the rectangular coordinate space S2. In addition, the arc along the angle direction (φ direction) in the polar coordinate map M'1 is longer as the arc is more distant from the reference position C (that is, as the distance r increases). Specifically, the arc along the angle direction (φ direction) in the polar coordinate map has a length proportional to the distance from the reference position C. By contrast, the length of a straight line along the distance direction (r direction) in the polar coordinate map M'1 is fixed regardless of the angle direction (φ direction).

For this reason, as described above, the setting unit 20E sets filtering windows F having sizes that are fixed in the distance direction (the distance r direction) in the polar coordinate space S1 and are different in the angle direction (φ direction). The setting unit 20E also sets filtering windows F with sizes in the angle direction (φ direction) inversely proportional to the distance r from the reference position C in the polar coordinate space S1.

With this structure, the information processing apparatus 20 according to the present embodiment is enabled to suppress change in size of the divided regions G occurring in coordinate transformation. Accordingly, the information processing apparatus 20 according to the present embodiment is enabled to further effectively improve the reliability of the occupancy of the target.

In addition, in the information processing apparatus 20 according to the present embodiment, the filtering unit 20F uses, for example, the maximum value filter or the minimum value filter. For example, suppose that the setting unit 20E sets filtering windows F having sizes that are fixed in the distance direction (distance r direction) in the polar coordinate space S1 and are different in the angle direction (φ direction). In such a case, when the filtering unit 20F performs filtering using the maximum filter, the filtering unit 20F is enabled to derive a polar coordinate map M'1 in which the occupancy of the target is expanded in the angle direction (φ direction).

In addition, there are cases where the rectangular coordinate map M2 is provided as a rectangular coordinate map M2 indicating regions in which no target exists. In such a case, when the filtering unit 20F performs filtering using the minimum value filter, the filtering unit 20F is enabled to produce a rectangular coordinate map M'2 indicating regions in which no target exists.

Besides, in the present embodiment, the filtering unit 20F executes dilation processing the number of times corresponding to the size of the filtering window F. This structure limits the number of divided regions G serving as the processing target per one time in the filtering unit 20F, and enables effective filtering.

Modification

The embodiment described above illustrates the case where the size of each of the divided regions G in the polar coordinate map M1 is equal to or larger than the size of each of the sensing points acquired by the external sensor 10B. Specifically, the embodiment described above illustrates the case where the resolution indicated with the density of the divided regions G in the polar coordinate map M1 is equal to or smaller than the sensor resolution of the external sensor 10B, as an example.

However, the resolution of the polar coordinate map M1 may be larger than the sensor resolution of the external sensor 10B.

Specifically, the map acquisition unit 20D may acquire a polar coordinate map M1 in which the resolution indicated with the density of the divided regions G is higher than the sensor resolution of sensing points P sensed by the external sensor 10B.

Also in this case, the processing unit 20A performs processing similar to that of the embodiment described above.

FIG. 9A to FIG. 9D and FIG. 10A and FIG. 10B are explanatory diagrams of derivation of a rectangular coordinate map M20 in the case of using a polar coordinate map M10 with a resolution higher than the sensor resolution of the external sensor 10B.

As illustrated in FIG. 9A, the external sensor 10B mounted on the moving body 10 acquires positional information of each of a plurality of sensing points P in the real space S. The position acquisition unit 20C acquires positional information of each of the sensing points P sensed by the external sensor 10B.

The map acquisition unit 20D acquires a polar coordinate map M10 illustrated in FIG. 9B using the pieces of positional information of the sensing points P illustrated in FIG. 9A.

The polar coordinate map M10 is a map specifying the first occupancy of the target in each of the divided regions G in the polar coordinate space S1. However, in the present modification, the resolution of the polar coordinate map M10 is higher than the sensor resolution of the external sensor 10B.

The resolution of the polar coordinate map M10 is determined according to the density of the divided regions G included in the polar coordinate map M10. For this reason, in the present modification, the storage unit 20B stores therein divided region information 31 in advance. The divided region information 31 is information indicating the size and the position of each of divided regions G obtained by dividing the polar coordinate space S1 into a plurality of divided regions G. However, the divided region information 31 is information indicating each of divided regions G having a size indicating a resolution higher than the sensor resolution of the external sensor 10B.

In the present modification, the map acquisition unit 20D disposes a grid indicating divided regions G indicated in the divided region information 31, in the polar coordinate space S1 with the current position of the moving body 10 serving as the distance $r_0$. In addition, the map acquisition unit 20D arranges sensing points P acquired by the position acquisition unit 20C, in positions indicated by the respective pieces of positional information of the sensing points P, in the polar coordinate space S1.

The map acquisition unit 20D sets the first occupancy of the target for each of the divided regions G in the polar coordinate space S1, in accordance with the sensing points P included in the divided region G. The method for setting the first occupancy is the same as the method in the first embodiment.

As described above, the map acquisition unit 20D acquires a polar coordinate map M10 of a resolution higher than the sensor resolution of the external sensor 10B (see FIG. 9B). The map acquisition unit 20D may acquire a polar coordinate map M10 from an external device through the communication unit 10D.

FIG. 9B illustrates a polar coordinate map M10 with a resolution in the angle direction (φ direction) higher than the resolution in the angle direction (φ direction) of the external sensor 10B. The map acquisition unit 20D may acquire a polar coordinate map M10 with a resolution higher than the resolution of the external sensor 10B, in both the angle direction and the distance direction (distance r direction). However, the map acquisition unit 20D preferably acquires a polar coordinate map M10 in which at least a resolution in the angle direction is higher than the resolution in the angle direction in the external sensor 10B.

Among the divided regions G illustrated in FIG. 9B, white regions 40B indicate that low occupancy (first occupancy) is specified for the regions. Among the divided regions G illustrated in FIG. 9B, regions 40A with oblique lines indicate that high occupancy (first occupancy) is specified for the regions. Among the divided regions G illustrated in FIG. 9B, regions 40C indicate that middle occupancy (first occupancy) is specified for the regions.

The setting unit 20E, the filtering unit 20F, the converting unit 20G, and the output controller 20H perform processing similar to those in the embodiment described above.

Specifically, the setting unit 20E sets a filtering window F of a larger size for a divided region G closer to the position of the moving body 10 (position of the distance $r_0$), for each of the divided regions G included in the polar coordinate map M10 (see FIG. 9C).

The filtering unit 20F derives the second occupancy from the first occupancy for each of the divided regions G in the polar coordinate map M10 using the filtering window F of the size set by the setting unit 20E.

In this manner, the filtering unit 20F generates a polar coordinate map M'10 specifying the second occupancy for each of the divided regions G, from the polar coordinate map M10 specifying the first occupancy for each of the divided regions G (see FIG. 9D).

As illustrated in FIG. 9D, in the polar coordinate map M'10, a region 40A for which high occupancy is specified is more expanded as the distance r from the moving body 10 is smaller, in comparison with the polar coordinate map M10 before filtering.

The converting unit 20G converts the polar coordinate map M'10 into the rectangular coordinate space S2. The converting unit 20G may perform coordinate transformation in the same manner as the embodiment described above.

FIG. 10A is a diagram in which the polar coordinate map M'10 (see FIG. 9D) is disposed in a rectangular coordinate space S2. FIG. 10A and FIG. 10B illustrate the case where the resolution of each of the divided regions G' in the rectangular coordinate space S2 is lower than the resolution of each of the divided regions G in the polar coordinate space S1. FIG. 10A and FIG. 10B illustrate the case where the resolution of each of the divided regions G' in the rectangular coordinate space S2 is the same as the sensor resolution of the external sensor 10B, as an example.

As illustrated in FIG. 10A, the polar coordinate map M'10 indicated with the polar coordinate space S1 has a shape converging toward the reference position C (position of the distance $r_0$) and spreading toward a direction going away from the reference position C, in the rectangular coordinate space S2.

The converting unit 20G performs coordinate transformation of the polar coordinate map M'10 into the rectangular coordinate space S2, to acquire a rectangular coordinate map M20 illustrated in FIG. 10B.

As illustrated in FIG. 10A, among the divided regions G in the polar coordinate map M'10, the divided region G disposed in a position closer to the reference position C (position of the distance $r_0$) is deformed and reduced with a larger degree. In addition, among the divided regions G in the polar coordinate map M'10, the divided region G (divided region G with a larger distance r) disposed in a position more distant from the reference position C has a size larger than the size of the corresponding divided region G' in the rectangular coordinate space S2.

For example, a divided region $G_{100}$ disposed in a position sufficiently distant from the reference position C in the polar coordinate map M'10 is larger than the size of the divided region G' in the rectangular coordinate space S2.

However, in the present modification, the resolutions of the polar coordinate map M10 and the polar coordinate map M'10 are higher than the sensor resolution of the external sensor 10B.

This structure suppresses expansion and specification of the second occupancy specified for the divided region $G_{100}$ disposed in a position sufficiently distant from the reference position C in the polar coordinate map M'10 into expanded regions (divided regions G' of a larger number) in coordinate transformation into the rectangular coordinate space S2.

With this structure, the present modification suppresses reduction in occupancy in the divided region G' close to the reference position C, and suppresses specification of the occupancy specified for the divided region G' disposed in a position distant from the reference position C for an expanded region by coordinate transformation.

The following is an explanation of a conventional method. FIG. 11A to FIG. 11C are explanatory diagrams of a conventional method.

In a conventional art, the filtering of the present embodiment is not performed. In addition, the conventional art performs no setting of filtering windows F with sizes corresponding to the distance from the reference position C. In conventional art, the resolution of the polar coordinate map M100 is equal to or lower than the sensor resolution of the external sensor 10B.

For this reason, no filtering using filtering windows F is performed, and a polar coordinate map M100 with a resolution equal to or lower than the sensor resolution (see FIG. 11A) is converted into the rectangular coordinate space S2 without any processing (see FIG. 11B and FIG. 11C).

For this reason, the occupancy determined as indicating that "no target exists" is specified for the region DC in a comparative rectangular coordinate map M202 derived by the conventional method (see region DD), while the occupancy determined to indicate that "the target exists" is specified for a region DC in a rectangular coordinate map M20 (see FIG. 10B) derived using the method of the present modification. For this reason, the reliability of the occupancy of the target is insufficient in the conventional method.

In addition, in the comparative rectangular coordinate map M202 derived by the conventional method, the second occupancy (see FIG. 11A and FIG. 11B) specified for a divided region $G_{100}$ disposed in a position sufficiently distant from the reference position C is specified for a region expanded into a plurality of regions G' in the rectangular coordinate space S2. For this reason, the reliability of the occupancy of the target is insufficient in the conventional method.

By contrast, in the present modification, the setting unit 20E sets a filtering window F of a size corresponding to the distance r from the reference position C, for each of the divided regions G included in the polar coordinate map M10 with a resolution higher than the sensor resolution. In addition, the filtering unit 20F performs filtering using the filtering window F of the set size on each of the divided regions G in the polar coordinate map M10, to derive the polar coordinate map M'10 specifying the second occupancy. The converting unit 20G performs coordinate transformation from the polar coordinate map M'10 into the rectangular coordinate space S2, to derive the rectangular coordinate map M20.

For this reason, the information processing apparatus 20 according to the present modification is enabled to suppress marked reduction in the occupancy specified for the polar coordinate map M1, due to deformation and/or reduction of the divided region G occurring at the time of coordinate transformation from the polar coordinate space S1 into the rectangular coordinate space S2, in the same manner as the embodiment described above. In addition, the information processing apparatus 20 according to the present modification further suppresses specification of the occupancy specified for a divided region G' disposed in a position distant from the reference position C for an expanded region due to coordinate transformation.

Figure 12:
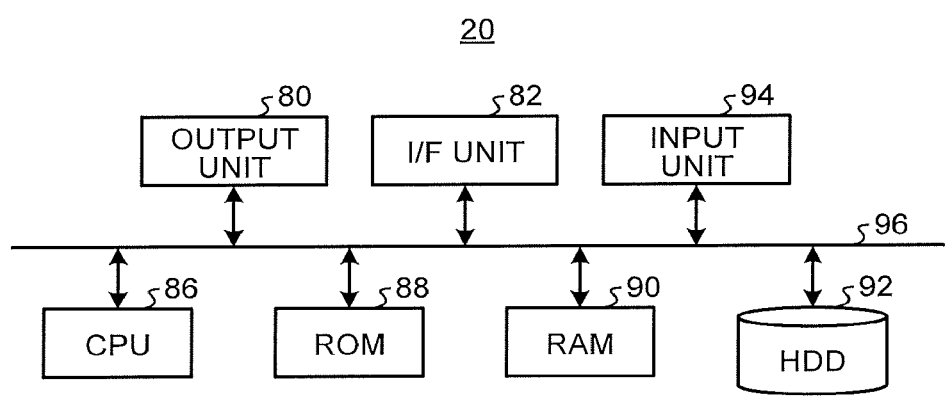
FIG. 12 is a diagram illustrating a hardware configuration.

The following is an explanation of an example of hardware configuration of the information processing apparatus 20 according to the embodiment and the modification described above. FIG. 12 is an example of a hardware configuration diagram of the information processing apparatus 20 according to the embodiment described above.

The information processing apparatus 20 according to the embodiment and the modification described above includes a control device such as a CPU 86, storage devices such as a read only memory (ROM) 88, a random access memory (RAM) 90, and a hard disk drive (HDD) 92, an I/F unit 82 serving as an interface between the apparatus and various devices, an output unit 80 outputting various types of information such as output information, an input unit 94 receiving user's operations, and a bus 96 connecting the units, and has a hardware configuration using an ordinary computer.

In the information processing apparatus 20 according to the embodiment described above, the CPU 86 reads a program from the ROM 88 onto the RAM 90 and executes the program, to achieve each of the units described above on the computer.

The program to execute each of the processing described above and executed in the information processing apparatus 20 of the embodiment and the modification described above may be stored in the HDD 92. The program to execute each of the processing described above and executed in the information processing apparatus 20 of the embodiment and the modification described above may be incorporated in advance in the ROM 88 to be provided.

In addition, the program to execute each of the processing described above and executed in the information processing apparatus 20 of the embodiment and the modification described above may be stored as a file in an installable form or an executable form, on a computer-readable storage medium such as a CD-ROM, a CD-R, a memory card, a digital versatile disc (DVD), and a flexible disk (FD), to be provided as a computer program product. As another example, the program to execute each of the processing described above and executed in the information processing apparatus 20 of the embodiment and the modification described above may be stored on a computer connected to a network such as the Internet, and may be provided by download through the network. As another example, the program to execute each of the processing described above and executed in the information processing apparatus 20 of the embodiment and the modification described above may be provided or distributed through a network such as the Internet.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An information processing apparatus comprising:
a memory; and
one or more processors configured to function as a map acquisition unit, a filtering unit, a converting unit, and a setting unit, wherein
the map acquisition unit acquires a polar coordinate map specifying first occupancy of a target in a polar coordinate space;
the filtering unit performs filtering on the polar coordinate map using filtering windows of sizes corresponding to a distance from a reference position;
the converting unit converts the filtered polar coordinate map into a rectangular coordinate space; and
the setting unit sets a filtering window of a larger size as the distance from the reference position in the polar coordinate space is smaller.

2. The information processing apparatus according to claim 1, wherein the setting unit sets the filtering windows of sizes that are fixed in a distance direction in the polar coordinate space and are different in an angle direction.

3. The information processing apparatus according to claim 1, wherein the setting unit sets the filtering windows of sizes in an angle direction inversely proportional to the distance from the reference position in the polar coordinate space.

4. The information processing apparatus according to claim 1, wherein the filtering unit performs the filtering using a maximum value filter or a minimum value filter.

5. The information processing apparatus according to claim 1, wherein the filtering unit performs the filtering executing dilation processing number of times corresponding to the sizes of the filtering windows.

6. The information processing apparatus according to claim 1, wherein
the map acquisition unit acquires the polar coordinate map specifying the first occupancy of the target for each of divided regions in the polar coordinate space,
the filtering unit derives second occupancy for each of the divided regions for which the filtering window is set, from the first occupancy of the divided region in the filtering window by the filtering using the filtering window, and
the converting unit converts the polar coordinate map including the divided regions for each of which the second occupancy is specified into the rectangular coordinate space.

7. The information processing apparatus according to claim 1, wherein the one or more processors are further configured to function as a position acquisition unit,
the position acquisition unit acquires positional information of each of sensing points, and
the map acquisition unit acquires the polar coordinate map by generating the polar coordinate map based on the positional information.

8. The information processing apparatus according to claim 7, wherein the map acquisition unit acquires the polar coordinate map with a resolution higher than a sensor resolution of the sensing points sensed by an external sensor.

9. An information processing method comprising:
acquiring a polar coordinate map specifying first occupancy of a target in a polar coordinate space;
performing filtering on the polar coordinate map using filtering windows of sizes corresponding to a distance from a reference position;
converting the filtered polar coordinate map into a rectangular coordinate space; and
setting a filtering window of a larger size as the distance from the reference position in the polar coordinate space is smaller.

10. The information processing method according to claim 9, wherein the setting sets the filtering windows of sizes that are fixed in a distance direction in the polar coordinate space and are different in an angle direction.

11. The information processing method according to claim 9, wherein the setting sets the filtering windows of sizes in an angle direction inversely proportional to the distance from the reference position in the polar coordinate space.

12. The information processing method according to claim 9, wherein, in the filtering, the filtering is performed using a maximum value filter or a minimum value filter.

13. The information processing method according to claim 9, wherein, in the filtering, the filtering is performed by executing dilation processing number of times corresponding to the sizes of the filtering windows.

14. The information processing method according to claim 9, wherein
the acquiring acquires the polar coordinate map specifying the first occupancy of the target for each of divided regions in the polar coordinate space,
the filtering derives second occupancy for each of the divided regions for which the filtering window is set, from the first occupancy of the divided region in the filtering window by the filtering using the filtering window, and
the converting converts the polar coordinate map including the divided regions for each of which the second occupancy is specified into the rectangular coordinate space.

15. The information processing method according to claim 9, further comprising:
acquiring positional information of each of sensing points, wherein
in acquiring of the polar coordinate map, the polar coordinate map is acquired by generating the polar coordinate map based on the positional information.

16. The information processing apparatus according to claim 1, wherein
the processors are configured to function as an output controller, wherein
the output controller displays, on a display unit, a display screen including a rectangular coordinate map obtained by converting the polar coordinate map into the rectangular coordinate space.

* * * * *